(12) United States Patent
Schmidtberg et al.

(10) Patent No.: US 7,278,571 B2
(45) Date of Patent: Oct. 9, 2007

(54) METHODS AND APPARATUS FOR COMMUNICATING CONDITION INFORMATION ASSOCIATED WITH AN ITEM

(75) Inventors: Rupert A. Schmidtberg, Westford, MA (US); Eric B. Schultz, Boxford, MA (US)

(73) Assignee: Sensitech Inc., Beverly, MA (US)

( * ) Notice: Subject to any disclaimer, the term of this patent is extended or adjusted under 35 U.S.C. 154(b) by 0 days.

(21) Appl. No.: 10/702,099

(22) Filed: Nov. 5, 2003

(65) Prior Publication Data

US 2004/0155106 A1    Aug. 12, 2004

Related U.S. Application Data

(60) Provisional application No. 60/475,554, filed on Jun. 3, 2003, provisional application No. 60/426,927, filed on Nov. 15, 2002.

(51) Int. Cl.
*G06K 15/00* (2006.01)
(52) U.S. Cl. ...................... 235/383; 235/385
(58) Field of Classification Search ................ 235/383, 235/385, 435, 436, 454, 472.01, 472.02; 705/22, 23, 28, 29; 340/572.1
See application file for complete search history.

(56) References Cited

U.S. PATENT DOCUMENTS

| | | | |
|---|---|---|---|
| 4,688,026 A | 8/1987 | Scribner et al. | |
| 4,827,395 A | 5/1989 | Anders et al. | |
| 5,499,017 A | 3/1996 | Beigel | |
| 5,629,981 A | 5/1997 | Nerlikar | |
| 5,732,401 A | 3/1998 | Conway | |
| 5,798,694 A | 8/1998 | Reber et al. | |
| 5,920,287 A * | 7/1999 | Belcher et al. | 342/450 |
| 5,995,046 A * | 11/1999 | Belcher et al. | 342/450 |
| 6,138,105 A | 10/2000 | Walker et al. | |
| 6,294,997 B1 | 9/2001 | Paratore et al. | |
| 6,542,933 B1 * | 4/2003 | Durst et al. | 709/229 |
| 6,563,417 B1 * | 5/2003 | Shaw | 340/10.1 |
| 6,681,990 B2 * | 1/2004 | Vogler et al. | 235/385 |
| 6,712,276 B1 * | 3/2004 | Abali et al. | 235/492 |
| 6,754,190 B2 * | 6/2004 | Gurney et al. | 370/329 |
| 6,826,267 B2 * | 11/2004 | Daum et al. | 379/102.03 |
| 6,830,181 B1 * | 12/2004 | Bennett | 235/440 |
| 6,842,877 B2 | 1/2005 | Robarts et al. | |
| 6,843,415 B2 * | 1/2005 | Vogler | 235/385 |

(Continued)

FOREIGN PATENT DOCUMENTS

WO    WO 2004046999 A2 *    6/2004

*Primary Examiner*—Uyen-Chau N Le
(74) *Attorney, Agent, or Firm*—Wolf, Greenfield & Sacks, P.C.

(57) ABSTRACT

One embodiment of the invention is directed to an apparatus including at least one storage device storing at least one dynamic identifier associated with at least one item, the at least one dynamic identifier configured to include at least one variable portion that has at least one of a variable content and a variable length based at least in part on at least one detectable condition associated with the at least one item. Another embodiment of the invention is directed to a signal transporting at least one dynamic electronic product code (EPC) associated with at least one item, the at least one dynamic EPC configured to include at least one portion that is variable based at least in part on at least one detectable condition associated with the at least one item.

39 Claims, 2 Drawing Sheets

EPC e.g., 64 or 96 bits

| version | Manufacturer/ Source ID | Product Type | Serial No. | Variable Portion (length/content) |
|---|---|---|---|---|

U.S. PATENT DOCUMENTS

| | | |
|---|---|---|
| 6,859,757 B2 | 2/2005 | Muehl et al. |
| 2001/0045893 A1 | 11/2001 | Swartzel et al. |
| 2002/0116274 A1 | 8/2002 | Hind et al. |
| 2002/0153411 A1 | 10/2002 | Wan et al. |
| 2003/0033280 A1 | 2/2003 | Van Den Hamer et al. |
| 2003/0072445 A1 | 4/2003 | Kuhlman et al. |
| 2003/0132854 A1 | 7/2003 | Swan et al. |
| 2003/0141985 A1 | 7/2003 | Haller et al. |
| 2003/0144985 A1 | 7/2003 | Ebert |
| 2003/0158857 A1 | 8/2003 | Weng et al. |
| 2003/0173403 A1 | 9/2003 | Volger |
| 2003/0216969 A1 | 11/2003 | Bauer et al. |
| 2004/0087273 A1 | 5/2004 | Perttila et al. |
| 2004/0145472 A1 | 7/2004 | Schmidtberg et al. |
| 2004/0145474 A1 | 7/2004 | Schmidtberg et al. |
| 2004/0155106 A1 | 8/2004 | Schmidtberg et al. |
| 2005/0199716 A1* | 9/2005 | Shafer et al. ............... 235/385 |

* cited by examiner

EPC
e.g., 64 or 96 bits

| version | Manufacturer/<br>Source<br>ID | Product<br>Type | Serial<br>No. | Variable Portion<br>(length/content) |

METHODS AND APPARATUS FOR COMMUNICATING CONDITION INFORMATION ASSOCIATED WITH AN ITEM

CROSS-REFERENCE TO RELATED APPLICATION

This application claims the benefit of U.S. Provisional Application Ser. No. 60/426,927, filed Nov. 15, 2002, entitled "Methods and Apparatus for Communicating Condition Information Associated With an Item," and further claims the benefit of U.S. Provisional Application Ser. No. 60/475,554, filed Jun. 3, 2003, entitled "Methods and Apparatus for Communicating Condition Information Associated With an Item." The entire disclosure of each of the aforementioned applications is hereby incorporated herein by reference.

FIELD OF INVENTION

The present invention relates generally to methods and apparatus for communicating information relating to one or more detectible conditions associated with an item. More particularly, one embodiment of the present invention is directed to a radio frequency (RF) identification system that employs dynamic electronic product codes (EPCs) having a variable content and/or length to represent information relating to one or more conditions associated with an item.

BACKGROUND

Auto-ID technology relates generally to using the Internet to track goods in a manufacturing process and/or supply chain (e.g. from manufacturer to distributor to point of sale location). One contemplated infrastructure for implementing the Auto-ID technology to transport information relating to physical objects via the Internet includes four major components: 1) electronic tags; 2) an electronic product code (EPC); 3) an object naming service (ONS); and 4) a physical markup language (PML).

An electronic tag typically is in the form of a small chip that is affixed to or otherwise integrated with an item to be tracked. Such tags may be implemented using a family of technologies that facilitate the transfer of data wirelessly between tagged objects or items and electronic readers. For example, radio frequency identification (RFID) tags have small radio antennas which are capable of transmitting data over a short range. Such RFID tags, when coupled to an RF reader network, facilitate tracking and identification of tagged items from place to place throughout all or a portion of a manufacturing process or supply chain/distribution network.

To uniquely identify tagged objects, a naming system referred to as the electronic product code (EPC) has been developed. The EPC was created to accommodate current and future naming methods, and is intended to be universally and globally accepted as a means to link physical objects to a computer network and to serve as an efficient information reference. A unique EPC assigned to an item to be tracked typically is "burned" into a memory/storage device of an RFID tag as a fixed binary number. Currently, EPCs typically are either 64 or 96 bits long. The EPC bit string is intended to uniquely identify an item by encoding the manufacturer, the product type, and the product serial number, for example.

It should be appreciated that the EPC in the RFID tag does not change as the item to which the tag is affixed goes through a manufacturing process and/or a supply chain; in particular, the RFID tag is designed to send a representation of the EPC as a fixed length and fixed content "information payload" to an RF reader or receiver. When queried (i.e., when passing an RF reader), the RFID tag wirelessly transmits a representation of the EPC to the reader, which in turn passes the received information on to one or more other processing devices for decoding the received information and subsequent routing. In the current art, components such as the savant, on object naming service (ONS) and PML server decode the tag.

Figure 1:
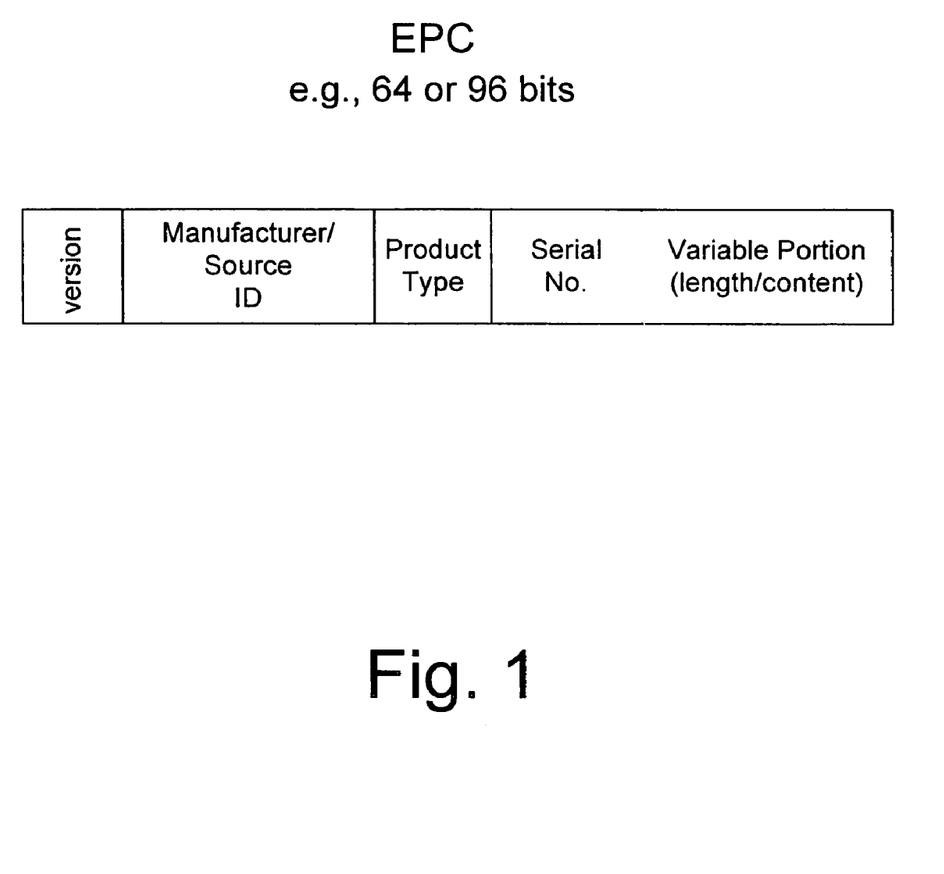
FIG. 1: illustrates one example of a dynamic EPC according to this embodiment.

The object naming service (ONS) is the "glue" which links the electronic product code (EPC) with one or more associated data files containing information relating to the tagged item. More specifically, the ONS is an automated networking service which, when given an EPC, returns one or more network addresses at which one or more data files corresponding to the tagged item may be located. In a typical system configuration, the ONS may be accessed by a computer that is local to the RF reader (and which provides user access to the system). The ONS is based on the concept of the standard domain naming service (DNS) used to identify website addresses corresponding to website names. For example, in a manner similar to that employed by the DNS, the ONS parses the EPC to decode particular information in specific fields of the EPC (e.g., the manufacturer ID, as shown in FIG. 1) so as to return (e.g., to a processor local to the RF reader) the appropriate address(es) where data is located.

The physical markup language (PML) is a standardized language protocol in which network information about physical objects is written. PML essentially is an XML-based language for databasing information about physical objects, and is designed to standardize descriptions of physical objects for use by both humans and machines. In one aspect, PML serves as a common base for software applications, data storage and analytical tools for industry and commerce. Once the ONS decodes an EPC as discussed above, it returns (e.g., to a local processor) one or more address(es) to a PML server which includes one or more databases in which are stored one or more files containing information regarding the tagged item. The local processor then may forward all or part of the EPC to the PML server, which in turn further processes the EPC to access the information in the database(s) regarding the tagged item. The PML server provides a standardized data output of the information using PML, which typically is forwarded back to the location of the RF reader (e.g., the local processor) for user analysis.

Additional details of the Auto-ID technology may be found in the following disclosures, each of which is hereby incorporated herein by reference:

"The Electronic Product Code (EPC), A Naming Scheme for Physical Objects," David L. Brock, MIT Auto-ID Center White Paper, Massachusetts Institute of Technology, 77 Massachusetts Avenue, Building 3, 449G, Cambridge, Mass. 02139-4307, published Jan. 1, 2001;

"The Compact Electronic Product Code, a 64-bit Representation of the Electronic Product Code," David L. Brock, MIT Auto-ID Center White Paper, Massachusetts Institute of Technology, 77 Massachusetts Avenue, Building 3, 449G, Cambridge, Mass. 02139-4307, published Nov. 1, 2001;

"The Virtual Electronic Product Code," David L. Brock, MIT Auto-ID Center White Paper, Massachusetts Institute of Technology, 77 Massachusetts Avenue, Building 3, 449G, Cambridge, Mass. 02139-4307, published Feb. 1, 2002;

"The Object Name Service, Version 0.5 (Beta)," Oat Systems and MIT Auto-ID Center White Paper, Massachusetts Institute of Technology, 77 Massachusetts Avenue, Building 3, 449G, Cambridge, Mass. 02139-4307, published Feb. 1, 2002;

"The Savant, Version 0.1 (Alpha)," Oat Systems and MIT Auto-ID Center White Paper, Massachusetts Institute of Technology, 77 Massachusetts Avenue, Building 3, 449G, Cambridge, Mass. 02139-4307, published Feb. 1, 2002; and "On the design A Global Unique Identification Scheme," Daniel W. Engels, MIT Auto-ID Center, Massachusetts Institute of Technology, 77 Massachusetts Avenue, Building 3, 449G, Cambridge, Mass. 02139-4307, published Jun. 1, 2002.

SUMMARY OF THE INVENTION

One embodiment of the invention is directed to an apparatus including at least one storage device storing at least one dynamic identifier associated with at least one item, the at least one dynamic identifier configured to include at least one variable portion that has at least one of a variable content and a variable length based at least in part on at least one detectable condition associated with the at least one item.

Another embodiment of the invention is directed to a signal transporting at least one dynamic electronic product code (EPC) associated with at least one item, the at least one dynamic EPC configured to include at least one portion that is variable based at least in part on at least one detectable condition associated with the at least one item.

DESCRIPTION OF INVENTION

One embodiment of the present invention extends the concept of a fixed electronic product code (EPC) to allow it to convey information relating to one or more conditions associated with an item. FIG. 1 illustrates one example of a dynamic EPC according to this embodiment. As shown in FIG. 1, in addition to manufacturer or source information, product type, product serial number, etc., the dynamic EPC may include a variable portion that is dynamically updated (e.g., by a processor in an RFID tag) to include information relating to one or more conditions associated with an item. That variable portion could be any one or more of the manufacturer/source, product type or serial number fields. As shown in FIG. 1, it is the serial number field that is variable. According to various aspects, this variable portion may be updated essentially in real time, periodically at some predetermined interval, upon the occurrence of a particular event (e.g., one or more conditions exceeding a predetermined threshold), and/or when the RFID tag storing the EPC is queried by an RF reader. Hence, in various aspects of this embodiment, the EPC may change depending on one or more conditions associated with an item or its environment. While the dynamic EPC embodiment shown in FIG. 1 includes separate fields for manufacturer/source ID and product type, the dynamic EPC alternatively may combine the manufacturer/source ID and product type into a single field, referred to as a global trade identification number (GTIN).

In addition, it should be appreciated that the invention of making variable and dynamic a portion of a field or fields of an EPC could apply to any now known or later accepted EPCs. For examples, EPCs under consideration now including fields having location, vehicle identification numbers (VINs), other product identification numbers, or the like, could employ the dynamic EPC concept of the invention. One or more of such fields could include a portion that is variable and dynamic in order to indicate a change in state or condition.

In another embodiment of the invention, such dynamic EPCs may be processed with the same reader and network infrastructure as that used for existing RFID tags (e.g. configured for use with static EPCs). In particular, as discussed above, like a static EPC, a dynamic EPC may be parsed in a manner similar to that conventionally employed for Internet website addresses (i.e. using an incremental/hierarchal parsing). For example, an ONS may decode a particular field of the dynamic EPC associated with a manufacturer or source ID, and return an address to a PML server for further processing of the dynamic EPC. At the PML server, one or more other fields of the EPC may be decoded, which may provide information to the PML server as to how to subsequently decode one or more remaining fields of the dynamic EPC. These remaining fields may have variable length and/or content. For example, with reference again to FIG. 1, the PML server may look to the serial no. field of an EPC to determine the manner in which to parse/decode/interpret one or more subsequent fields containing information regarding the condition of the item or otherwise associated with the item.

The information encoded in the dynamic EPC regarding one or more conditions associated with the item may be used for overall quality assessment of an item, based on such factors including, but not limited to, temperature monitoring of a perishable product, weight monitoring, shock monitoring, remaining shelf life prediction, and time out of refrigeration indications, for example. More generally, the information encoded in a dynamic EPC according to various embodiments of the present invention may relate to any one or more aspects or characteristics of an item itself, including elements of an item's history, environment, geographic location, and the like. In various aspects of the present invention, the implementation of dynamic EPCs particularly facilitates monitoring of conditions of perishable products, products for human or animal consumption or use, agricultural products, medical products (e.g. medicines, vaccines, etc.) as well as other products as they travel through manufacturing and supply/distribution chains.

Figure 2:
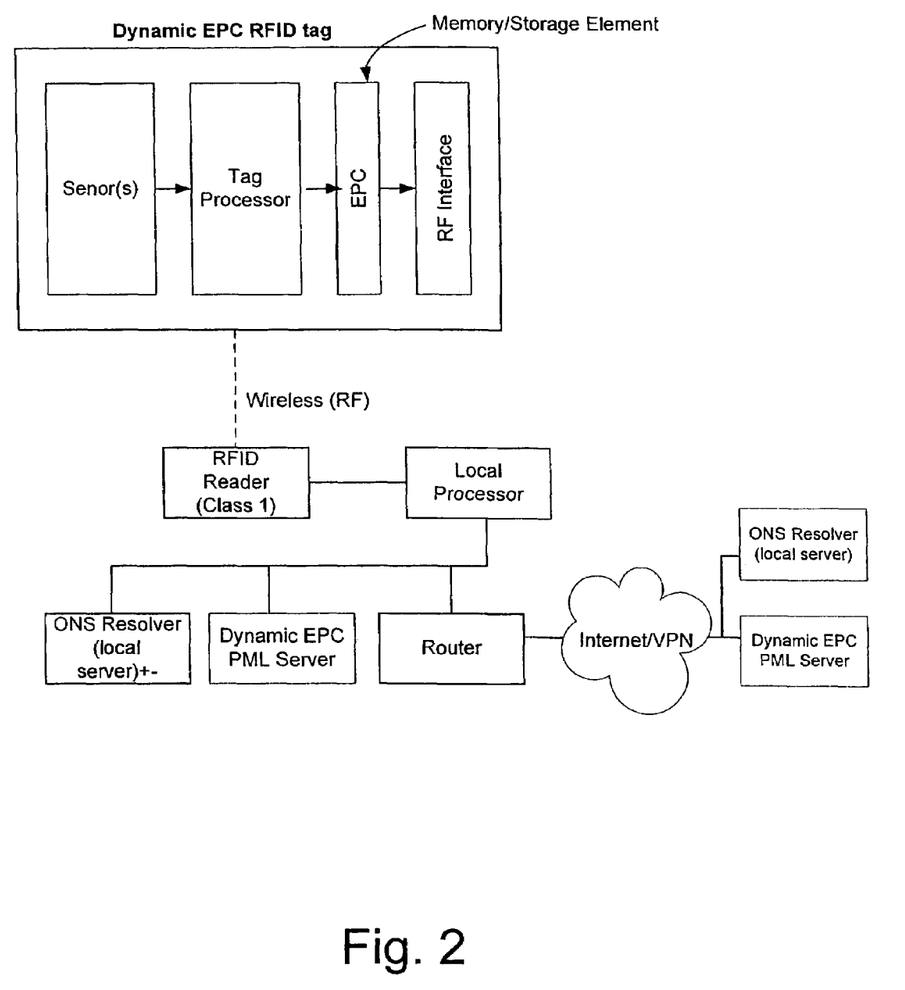
FIG. 2: illustrates an overall system for processing such dynamic EPCs.

An overall system for processing such dynamic EPCs is shown in FIG. 2. As shown in FIG. 2, a tag processor of an RFID tag may periodically monitor one or more sensors to obtain information relating to a condition associated with the item. In various embodiments, one or more sensors may be built in with the tag itself. The tag processor may be configured to use this information to determine if any alarm conditions have been triggered. If so, the tag processor may modify one or more appropriate bits in the EPC stored in memory to indicate that an alarm condition has occurred. For example, the tag processor may use sensor values to update any counters that are represented in one or more bits of the EPC so as to indicate time out of refrigeration, trip length, etc.

More generally, various examples of information that may be encoded in a dynamic EPC as "raw" data or as information that has been generated by a tag processor based on one or more measured conditions includes, but is not limited to, temperature-related information (e.g., actual temperature, average temperature, mean kinetic temperature, time above or below a particular temperature or temperature range or within a particular temperature range), elapsed time since some event (e.g., tag activated, by a user or by an RF reader for example, to indicate the beginning of a monitoring period), weight-related information, geography/location-related information, information relating to physical conditions (e.g., impact/shock/deformation, etc.), information relating to a container/package in which an item is stored (e.g., was container/package opened at some point, where, for how long, etc.), as well as various alarm indications relating to any one or more of the foregoing or other factors associated with an item. From the foregoing, it should be appreciated that a tag processor of an RFID tag configured to support a dynamic EPC may perform a number of processing functions relating to one or more pieces of raw/measured/sensed data to generate information that ultimately is represented in some form in a dynamic EPC. It should also be appreciated that the foregoing examples are provided primarily for purposes of illustration, and that the invention is not limited in these respects.

Turning again to FIG. 2, according to one embodiment of the invention, when the dynamic EPC RFID tag enters an RFID reader's field, the reader transmits a signal to the tag requesting its EPC. The RF interface in the tag reads the current value of the EPC and transmits it to the reader. The reader receives the tag's transmission and passes the EPC to a local processor. The local processor in turn queries an ONS resolver for the Internet IP address of the PML server storing data relating to the item represented by the dynamic EPC. For example, as discussed above, the ONS resolver decodes a portion of the dynamic EPC (e.g. the manufacturer ID), uses it to determine the IP address of the appropriate PML server, and passes this IP address back to the local processor, which then sends the dynamic EPC to the PML server.

In addition to the foregoing, the local processor also may pass to the PML server some information regarding the RF reader that received the EPC; for example, in one embodiment, the RF reader may be associated with some form of identification that the local processor passes on to the PML server. This identification may be a serial no. or some indication of a geographic location of the RF reader, for example. In one aspect, the RF reader identification may itself be in the form of a static or dynamic EPC; in the case of a dynamic EPC, information regarding the status/operating condition of the RF reader itself may be conveyed in addition to or in place of identification/geographic location information relating to the RF reader. In the case of a dynamic EPC for the reader, a portion of a field or fields of that dynamic reader EPC would be variable. That portion would contain information, that can be dynamically changed, to indicate a change in state of the reader itself. Additionally, information regarding the version of software or firmware running on the RF reader may be conveyed in the RF reader identification. In this manner, it should be appreciated that according to one embodiment, the local processor may provide to the PML server a first dynamic EPC relating to an item, accompanied by additional information, for example a second dynamic EPC, relating to the RF reader that acquired the first dynamic EPC.

Upon receiving a communication from the local processor, the PML server in turn decodes the dynamic EPC relating to the item to determine the tag identification and information associated with the item (e.g., condition information) to which the tag is affixed. The dynamic EPC PML server also may store the current date and time, the tag identification, and the condition information in a database for later reporting and analysis. If the local processor also provides to the PML server some information (e.g., an identifier, static or dynamic EPC, etc.) regarding the RF reader, the PML server similarly may store this information.

The PML server then passes back to the local processor an XML package which includes the item ID and the information associated with the item and/or its environment (including the RF reader if such information is provided) based on the dynamic EPC. The local processor causes the information either to be displayed (e.g., to an operator) or relayed to another computer for further processing.

As shown in FIG. 2, one or both of the ONS resolver and the PML server may be located at various locations with respect to the RFID reader and local processor.

It should be appreciated that various aspects of the invention, as discussed above, may be implemented in any of numerous ways, as the invention is not limited to any particular manner of implementation. Examples of specific implementations are provided herein for illustrative purposes only.

For example, it should be appreciated that in other embodiments of the invention, the concept of a dynamic EPC is extended to a more general item identifier having at least one portion that has a variable content and or length based on one or more conditions associated with an item. In particular, in one embodiment, the intelligence for monitoring one or more sensed raw conditions (e.g., temperature, time, location, other environmental conditions, etc.), processing the sensed conditions, and modifying a dynamic identifier based on such processing is self-contained in an identification tag to be affixed, attached, integrated or otherwise associated with an item. Additionally, in other embodiments such dynamic identifiers may be communicated from the identification tag using techniques other than RF.

Additionally, it should be appreciated that such identification tags may be associated with a wide variety of items, examples of which include, but are not limited to, single goods, collections of goods (e.g., a palette of goods), containers for one or more goods (e.g., a shipping container), a vehicle, a person, etc. Also, examples of various types of conditions that may be sensed and processed by such tags and encoded in dynamic identifiers include, but are not limited to, various environmental conditions including temperature and humidity, geographic location, pressure (e.g., shock or impact), time, motion, speed, orientation, illumination conditions, and the like. Moreover, one or more processors integrated with such identification tags may be configured to monitor raw conditions and provide information encoded in dynamic identifiers based on a predetermined threshold being exceeded by one or more monitored conditions.

Based on the more general concepts outlined above, a wide variety of applications for dynamic identifiers are contemplated according to various aspects of the present invention. For example, in one embodiment, a food item such as a bottle of milk may include a tag configured with a dynamic identifier that is capable of indicating if the milk was exposed to an undesirable temperature condition. In one aspect of this embodiment, as the tag attached to the bottle of milk is scanned, for example, at a check-out counter, a local processor at the check-out counter is able to indicate, based on the scanned identifier, if the milk was exposed to the undesirable temperature condition and perhaps of an inferior quality as a result. In yet another embodiment, an electronic registry sticker having a variable color display may be equipped with a tag including a dynamic identifier that is capable of indicating an elapsed time from a certain date. In one aspect of this embodiment, a counter may be implemented to change one or more bits of a dynamic identifier to indicate the passage of particular periods of time. For example, the registry sticker may be configured such that a processor integrated with the sticker periodically monitors the dynamic identifier and turns the sticker yellow when the dynamic identifier indicates that eleven months have passed, and red when the dynamic identifier indicates that twelve months have passed (e.g., to indicate an expiration of the sticker).

According to yet another embodiment of the invention, a dynamic identifier (such as a dynamic EPC) may be varied based on changing conditions in an overall supply/distribution chain. In particular, in various applications, a dynamic identifier may be varied to indicate a late shipment, an early shipment or a duplicate shipment.

For example, in one scenario, one box of goods is ordered from a supplier, and two boxes of identical goods inadvertently are shipped by the supplier. Each box is equipped with a tag including a dynamic identifier. The first box is received and accepted. The second box is received at a later time (e.g., the next day), and the receiver realizes that it is a duplicate. The tag is configured such that, at this point, the receiver can program the dynamic identifier to indicate that the receiver is now the shipper, and the original shipper is now the receiver, so that the duplicate box may be transported back to its place of origin. In yet another scenario, a box of goods arrives to a destination ahead of schedule, and a tag attached to the goods, including a dynamic identifier, is programmed such that the dynamic identifier may indicate at a later time period (e.g., three days, three weeks, etc.) that the early arrival should be placed back into the stream of goods in the supply chain.

It should be appreciated the foregoing examples are provided primarily for purposes of illustration, and that all combinations of the foregoing concepts are contemplated as being part of the inventive subject matter disclosed herein. In particular, all combinations of claimed subject matter appearing at the end of this disclosure are contemplated as being part of the inventive subject matter.

Having thus described several illustrative embodiments of the invention, various alterations, modifications, and improvements will readily occur to those skilled in the art. Such alterations, modifications, and improvements are intended to be within the spirit and scope of the invention. Accordingly, the foregoing description is by way of example only, and is not intended as limiting. It should be appreciated that while not described herein, the invention contemplates covering a tag which has an EPC that identifies the tag but also has additional memory for storing additional information. This is alternative to the 64-bit or 96-bit embodiments described.

What is claimed is:

1. An apparatus, comprising:
   at least one storage device storing at least one dynamic identifier associated with at least one item, the at least one dynamic identifier configured to include a variable portion, the variable portion being comprised of one or more bits which were previously fixed and used to represent information identifying an item and not to represent any detectable environmental or physical condition, wherein the variable portion has at least one of a variable content and a variable length and represents, at least in part, at least one detectable environmental or physical condition associated with the at least one item;
   wherein the at least one dynamic identifier includes at least one dynamic electronic product code (EPC); and
   wherein the at least one dynamic EPC further includes a fixed portion including a first identifier related to a source of the at least one item, a second identifier related to a product type of the at least one item, and a third identifier related to a serial number of the at least one item.

2. The apparatus of claim 1, wherein the at least one dynamic identifier has a fixed length and a plurality of fields, and wherein the variable portion has a variable content based at least in part on the at least one detectable environmental or physical condition and at least one field of the plurality of fields.

3. The apparatus of claim 1, wherein the at least one detectable environmental or physical condition relates to a measurable parameter of the at least one item itself.

4. The apparatus of claim 1, wherein the at least one detectable environmental or physical condition relates to a measurable parameter of at least one environment in which the at least one item is found.

5. The apparatus of claim 1, wherein the at least one detectable environmental or physical condition relates to an elapsed time from at least one event associated with the at least one item.

6. The apparatus of claim 1, in combination with the at least one item.

7. The combination of claim 6, wherein the apparatus is integrated with the at least one item.

8. The combination of claim 7, wherein the apparatus is attached to the at least one item.

9. The combination of claim 7, wherein the apparatus is embedded in the at least one item.

10. The apparatus of claim 1, wherein the at least one storage device is configured to store the at least one dynamic EPC as a variable binary number.

11. The apparatus of claim 10, wherein the variable binary number includes at least 64 bits.

12. The apparatus of claim 10, wherein the variable binary number includes at least 96 bits.

13. The apparatus of claim 10, wherein the variable binary number includes at least 128 bits.

14. The apparatus of claim 1, wherein the at least one storage device is configured to be updated periodically so as to refresh the at least one dynamic EPC.

15. The apparatus of claim 1, wherein the at least one storage device is configured to be updated periodically so as to refresh the at least one dynamic EPC based on at least one change in the at least one detectable environmental or physical condition associated with the at least one item.

16. The apparatus of claim 1, wherein the at least one detectable environmental or physical condition includes at least one temperature associated with the at least one item, and wherein the variable portion of the at least one dynamic EPC includes at least one representation of the at least one temperature.

17. The apparatus of claim 16, wherein the at least one detectable environmental or physical condition includes at least one refrigeration condition associated with the at least one item, and wherein the variable portion of the at least one dynamic EPC includes at least one representation of the at least one refrigeration condition.

18. The apparatus of claim 1, wherein the at least one detectable environmental or physical condition relates to a shelf life of the at least one item, and wherein the variable portion of the at least one dynamic EPC includes at least one representation relating to the shelf life.

19. The apparatus of claim 1, wherein the at least one detectable environmental or physical condition relates to at least one impact sustained by the at least one item, and wherein the variable portion of the at least one dynamic EPC includes at least one representation relating to the at least one impact.

20. The apparatus of claim 1, wherein:
the at least one storage device is configured to be updated periodically so as to refresh the at least one dynamic EPC based on at least one change in the at least one detectable environmental or physical condition associated with the at least one item;
the at least one detectable environmental or physical condition includes at least one t temperature associated with the at least one item;
the variable portion of the at least one dynamic EPC includes at least one representation of the at least one temperature;
the at least one dynamic EPC further includes a fixed portion including at least one of:
a first identifier related to a source of the at least one item;
a second identifier related to a product type of the at least one item; and
a third identifier related to a serial number of the at least one item;
the at least one storage device is configured to store the at least one dynamic EPC as a variable binary number; and
the variable binary number includes at least 64 bits.

21. The apparatus of claim 20, in combination with the at least one item.

22. The combination of claim 21, wherein the apparatus is integrated with the at least one item.

23. The combination of claim 22, wherein the apparatus is attached to the at least one item.

24. The combination of claim 22, wherein the apparatus is embedded in the at least one item.

25. A signal transporting at least one dynamic electronic product code (EPC) associated with at least one item, the at least one dynamic EPC configured to include a variable portion, a variable portion being comprised of one or more bits which were previously fixed and used to represent information identifying an item and not to represent any environmental or physical detectable condition, wherein the variable portion is variable to represent, at least in part, at least one detectable environmental or physical condition associated with the at least one item;
wherein the at least one dynamic EPC further includes a fixed portion including at least one of a first identifier related to a source of the at least one item, a second identifier related to a product type of the at least one item, and a third identifier related to a serial number of the at least one item.

26. The signal of claim 25, wherein the signal is a radio-frequency (RF) signal configured for wireless transmission.

27. The signal of claim 25, wherein the signal is configured for optical transmission.

28. The signal of claim 25, wherein the signal is configured for transmission over a network.

29. The signal of claim 25, wherein the fixed portion comprises the third identifier related to a serial number of the at least one item.

30. The signal of claim 25, wherein the at least one dynamic EPC is encoded as a variable binary number.

31. The signal of claim 30, wherein the variable binary number includes at least 64 bits.

32. The signal of claim 30, wherein the variable binary number includes at least 96 bits.

33. The signal of claim 30, wherein the variable binary number includes at least 128 bits.

34. The signal of claim 25, wherein the at least one detectable environmental or physical condition includes at least one temperature associated with the at least one item, and wherein the variable portion of the at least one dynamic EPC includes at least one representation of the at least one temperature.

35. The signal of claim 34, wherein the at least one detectable environmental or physical condition includes at least one refrigeration condition associated with the at least one item, and wherein the variable portion of the at least one dynamic EPC includes at least one representation of the at least one refrigeration condition.

36. The signal of claim 25, wherein the at least one detectable environmental or physical condition relates to a shelf life of the at least one item, and wherein the variable portion of the at least one dynamic EPC includes at least one representation relating to the shelf life.

37. The signal of claim 25, wherein the at least one detectable environmental or physical condition relates to at least one impact sustained by the at least one item, and wherein the variable portion of the at least one dynamic EPC includes at least one representation relating to the at least one impact.

38. The signal of claim 25, wherein:
the at least one detectable environmental or physical condition includes at least one temperature associated with the at least one item;
the variable portion of the at least one dynamic EPC includes at least one representation of the at least one temperature;
the at least one dynamic EPC further includes a fixed portion including at least one of:
a first identifier related to a source of the at least one item;
a second identifier related to a product type of the at least one item; and
a third identifier related to a serial number of the at least one item;
the at least one dynamic EPC is encoded as a variable binary number including at least 64 bits; and
the signal is a radio-frequency (RF) signal configured for wireless transmission.

39. An apparatus, comprising:
at least one storage device storing at least one dynamic identifier associated with at least one item, the at least one dynamic identifier configured to include a variable portion, the variable portion being comprised of one or more bits which were previously fixed and used to represent information identifying an item and not to represent any environmental or physical detectable condition, wherein the variable portion has at least one of a variable content and a variable length and represents, at least in part, at least one detectable environmental or physical condition associated with the at least one item;
at least one sensor to monitor the at least one detectable environmental or physical condition and provide raw condition information representing the at least one detectable environmental or physical condition; and at least one processor, coupled to the at least one storage device and the at least one sensor, to process the raw condition information to provide processed condition information that is different from the raw condition information, the at least one processor configured to periodically update the at least one dynamic identifier so as to provide a representation of the processed condition information as the variable content in the variable portion of the at least one dynamic identifier.

* * * * *

UNITED STATES PATENT AND TRADEMARK OFFICE
CERTIFICATE OF CORRECTION

PATENT NO. : 7,278,571 B2  
APPLICATION NO. : 10/702099  
DATED : October 9, 2007  
INVENTOR(S) : Rupert A. Schmidtberg et al.

It is certified that error appears in the above-identified patent and that said Letters Patent is hereby corrected as shown below:

In Claim 20, line 19, "one t temperature" should read -- one temperature --.

In Claim 25, line 48, "a variable portion" should read -- the variable portion --.

Signed and Sealed this

Twenty-sixth Day of February, 2008

JON W. DUDAS  
*Director of the United States Patent and Trademark Office*

UNITED STATES PATENT AND TRADEMARK OFFICE
CERTIFICATE OF CORRECTION

PATENT NO. : 7,278,571 B2 Page 1 of 1
APPLICATION NO. : 10/702099
DATED : October 9, 2007
INVENTOR(S) : Rupert A. Schmidtberg et al.

It is certified that error appears in the above-identified patent and that said Letters Patent is hereby corrected as shown below:

Column 9 in Claim 20, line 19, "one t temperature" should read -- one temperature --.

Column 9 in Claim 25, line 48, "a variable portion" should read -- the variable portion --.

This certificate supersedes the Certificate of Correction issued February 26, 2008.

Signed and Sealed this

Eighteenth Day of March, 2008

JON W. DUDAS
*Director of the United States Patent and Trademark Office*